US009021054B2

(12) United States Patent
Tran et al.

(10) Patent No.: US 9,021,054 B2
(45) Date of Patent: *Apr. 28, 2015

(54) ELECTRONIC INFORMATION CACHING

(71) Applicant: AOL Inc., Dulles, VA (US)

(72) Inventors: Vinh Tran, Fairfax, VA (US); Brian Sullivan, Purcellville, VA (US); Harry G. Morgan, Leesburg, VA (US); Ronald Howard, Dale City, VA (US)

(73) Assignee: AOL Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/263,502

(22) Filed: Apr. 28, 2014

(65) Prior Publication Data

US 2014/0237188 A1 Aug. 21, 2014

Related U.S. Application Data

(63) Continuation of application No. 11/276,586, filed on Mar. 6, 2006, now Pat. No. 8,751,599, which is a continuation of application No. 09/750,027, filed on Dec. 29, 2000, now Pat. No. 7,039,683.

(60) Provisional application No. 60/234,996, filed on Sep. 25, 2000.

(51) Int. Cl.
*G06F 15/16* (2006.01)
*H04L 29/08* (2006.01)
(Continued)

(52) U.S. Cl.
CPC ...... *H04L 67/2857* (2013.01); *G06F 17/30902* (2013.01); *G06F 12/0868* (2013.01)

(58) Field of Classification Search
CPC .............................. H04L 67/10; H04L 67/02
See application file for complete search history.

(56) References Cited

U.S. PATENT DOCUMENTS 5,442,771 A 8/1995 Filepp et al.
5,878,223 A 3/1999 Becker et al.
(Continued)

FOREIGN PATENT DOCUMENTS

WO       WO 9814894 A1    4/1998

OTHER PUBLICATIONS

Chen, H. et al., "Wormhole Caching with HTTP PUSH Method for a Satellite-Based Web Content Multicast and Replication System," Proceedings of the 4th International Cashing Workshop, San Diego, Mar. 1999.
Floyd, S. et al., "Adaptive Web Caching," Lawrence Berkeley National Laboratory, Cache Workshop '97, Jun. 10, 1997, Retrieved on Mar. 2, 2005 from http://www.icir.org/floyd/talks/sf-cache.pdf.
Griffioen, J. et al., "Automatic Prefetching in a WAN," Advances in Parallel and Distributed Systems, Proceedings of the IEEE Workshop in Princeton, NJ, Oct. 6, 1993, pp. 8-12.

(Continued)

*Primary Examiner* — Ranodhi Serrao
(74) *Attorney, Agent, or Firm* — Bookoff McAndrews, PLLC

(57) ABSTRACT

Electronic information is made more readily available to one or more access requestors based on an anticipated demand for the electronic information using a process, system or computer software. For instance, electronic information stored on a first storage medium is identified for transport (e.g., in response to a request of at least one of the access requestors), and the electronic information is transported accordingly. Afterwards, a determination is made to store the electronic information on a second storage medium that is more accessible to the access requestors than the first storage medium. The determination is based on an anticipated demand of the access requestors for the electronic information. The anticipated demand is determined based at least on information that is not particular to any single access requestor. The electronic information then is stored on the second storage medium and the access requestors are provided access to the electronic information from the second storage medium.

20 Claims, 10 Drawing Sheets

(51) Int. Cl.
*G06F 17/30* (2006.01)
*G06F 12/08* (2006.01)

(56) References Cited

U.S. PATENT DOCUMENTS

| | | | | |
|---|---|---|---|---|
| 6,065,058 | A | 5/2000 | Hailpern et al. | |
| 6,085,193 | A | 7/2000 | Malkin et al. | |
| 6,098,064 | A | 8/2000 | Pirolli et al. | |
| 6,249,804 | B1 | 6/2001 | Lam | |
| 6,324,182 | B1 * | 11/2001 | Burns et al. | 370/429 |
| 6,393,526 | B1 | 5/2002 | Crow et al. | |
| 6,415,368 | B1 | 7/2002 | Glance et al. | |
| 6,427,172 | B1 | 7/2002 | Thacker et al. | |
| 6,434,609 | B1 | 8/2002 | Humphrey | |
| 6,463,508 | B1 | 10/2002 | Wolf et al. | |
| 6,578,068 | B1 * | 6/2003 | Bowman-Amuah | 709/203 |
| 6,622,168 | B1 * | 9/2003 | Datta | 709/219 |
| 6,658,463 | B1 | 12/2003 | Dillon et al. | |
| 6,769,009 | B1 * | 7/2004 | Reisman | 709/201 |
| 7,039,708 | B1 * | 5/2006 | Knobl et al. | 709/227 |

OTHER PUBLICATIONS

Gwertzman, J. et al., "The Case for Geographical Push-Caching," 1995, HotOS-V, Proceedings of the 5th Workshop on Hot Topics in Operating Systems, May 4-5, 1995, pp. 51-55.

Markatos, E.P. et al., "A Top-10 Approach to Prefetching the Web," Technical Report 173, ICS-FORTH, Aug. 1996, pp. 1-15.

Michael, S. et al., "Adaptive Web Caching: Towards a New Caching Architecture," Apr. 12, 1998, Retrieved on Mar. 2, 2005 from http://wwwrm.inf.tu-dresden.de/~buchholz/diss/bibliography/web_caching/zhang98-AdaptiveWebCaching.pdf.

Padmanabhan, V.N. et al., "Using Predictive Prefetching to Improve World Wide Web Latency," ACM Computer Communication Review, 1996, vol. 26, No. 3, 15 pages.

Zhang, L. et al., "An In-Depth Survey on Web Caching," Math and Computer Science Department, Kent State University, Apr. 1999, Section 6, Retrieved on Jun. 7, 2004 from http://trident.mcs.kent.edu/~lzhang/data/thesis/web_cache.html#techniques.

* cited by examiner

ELECTRONIC INFORMATION CACHING

CROSS REFERENCE TO RELATED APPLICATIONS

This application is a continuation of pending U.S. application Ser. No. 11/276,586, now allowed, filed Mar. 6, 2006, which is a continuation application of U.S. application Ser. No. 09/750,027, filed Dec. 29, 2000, now U.S. Pat. No. 7,039,683, issued May 2, 2006, which claims the benefit of priority from U.S. Provisional Application No. 60/234,996, filed Sep. 25, 2000, all of which are incorporated by reference in their entirety.

TECHNICAL FIELD

This application relates to making electronic information available to an access requestor.

BACKGROUND

Inter-networked computer systems allow users to remotely access electronic information. These users, referred to as access requestors, sometimes experience delays in obtaining access to electronic information that concurrently is being accessed by one or more other access requestors within a short time period. For example, when the Independent Counsel's Report on the President was initially made available on-line, a large number of access requests were made within a short period of time, resulting in delays and failed requests.

SUMMARY

In one general aspect, electronic information caching may make electronic information more readily available to an access requestor based on an anticipated demand for that information. When requests for selected electronic information stored on a first storage medium are anticipated, the selected electronic information is accessed and duplicated on a second, more accessible storage medium. The access requestor then is provided with access to the selected electronic information on the second storage medium if it is available. Otherwise, the access requestor is provided with the selected electronic information from the first storage medium.

Implementations may include one or more of the following features. For example, the electronic information can be made more accessible in a number of ways, such as by selecting a second storage medium that is either physically, logically or electronically more proximate to the access requestor than the first storage medium. In addition, the first storage medium may be on a central server and the second storage medium may be on a distributed server. The electronic information may be stored in a database on the first storage medium. Anticipating future requests for access to selected electronic information may be based on: past requests for access to the same or related electronic information by access requestors; past requests for access to non-related electronic information by access requestors; past requests for access to related non-electronic information by access requestors; or, past requests for access to non-related non-electronic information by access requestors. The relevant access activity that is measured may include the frequency or volume of requests for access to the selected electronic information. Anticipating requests for access also may determine the file size to assign a cache value based on the file size and the frequency of requests for the selected electronic information. Thus, selected electronic information with a higher cache value is more likely to be anticipated. Anticipating requests for access may also take into account criteria that are unrelated to past access requests. Requests for access may be anticipated before, after, or while an access request is made.

Implementations of the above features may include methods, systems and/or computer software. The details of one or more implementations are set forth in the accompanying drawings and in the following description. Other features and advantages will be apparent from the description and drawings, and from the claims.

DESCRIPTION OF DRAWINGS

Like reference symbols in the various drawings indicate like elements.

DETAILED DESCRIPTION

Figure 1:
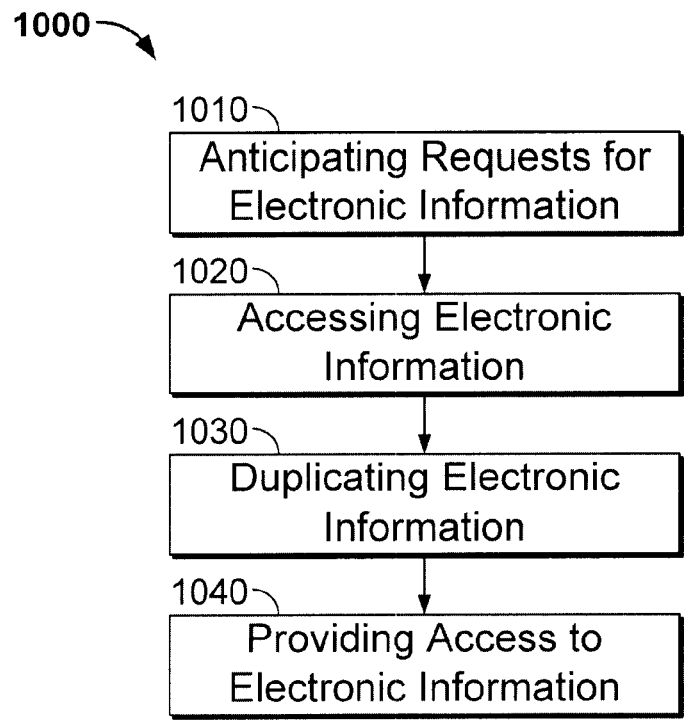
FIG. 1 is a flowchart of a method for making electronic information readily available to an access requestor.

Referring to FIG. 1, a method 1000 for making electronic information readily available to an access requestor includes anticipating requests for electronic information (step 1010), accessing electronic information for which a high volume of requests is anticipated (step 1020), duplicating the accessed electronic information (step 1030) and making the duplicated electronic information accessible to an access requestor (step 1040). In general, electronic information includes one or more of text, images, movies, music or other sounds, animations, 3D virtual worlds, and links to other objects.

Anticipating requests for electronic information (step 1010) is generally performed based on one or more criteria, such as past requests for information, popularity of the subject matter, feedback by access requestors regarding topics of interest or other criteria, formal or informal polling data, and survey research. For example, requests for electronic information may be anticipated by collecting past requests for information made by an access requestor. The past requests for information may be obtained by using hardware or software capable of storing information concerning online usage, such as a cookie. A cookie is software stored on a computer that is capable of monitoring the activities of a web browser on that computer. The cookie reports information back to the web server indicating each time the browser requests a page from the web server.

Thus, a profile of information can be built indicating the browser destinations of a specific access requestor and electronic information selected by that access requestor. In this way, hobbies, pursuits and other topics of interest can be anticipated for the access requester by analyzing collected data, usage patterns and past requests for information. Another example of anticipating requests for electronic information includes compiling information concerning the popularity of certain subject matter for one or more classes of access requestor. For example, senior citizens and car enthusiasts are each classes of persons having identifiable yet common interests. Based upon such common interests, requests for electronic information can be anticipated for the class members. Feedback on topics of interest for individuals or classes of access requestors can be obtained using conventional or electronic means. For example, email messages that ask specific questions or that include survey requests can be sent to access requestors. Such information can also be obtained by using regular mail for delivery to access requestors or by telephone contact with access requestors.

In this manner, the anticipation of requests for electronic information may be based on criteria unrelated to past requests for electronic information. Moreover, anticipation of requests for certain electronic information may occur before, after, or concurrently with requests for access to the electronic information. When anticipating based on past requests for information, the past requests for information may be measured by the frequency or volume of access requests. Additionally, a cache value may be assigned to the selected electronic information based on its file size and the frequency of requests for the selected electronic information. In this implementation, selected electronic information with higher cache values are more likely to be anticipated. The past requests may be for the same information, related information, or information not related to the requested electronic information, and for information in an electronic format or otherwise.

Accessing requested electronic information (step 1020) generally includes identifying the selected electronic information from within electronic information that is stored on a storage medium. Accessing electronic information also includes reading or otherwise making the selected electronic information available from within the source storage medium. Examples of storage media include a magnetic disk, such as, for example, an internal hard disk and removable disk, magneto-optical and optical disks, and compact disks whether in read only format, such as, for example, CD-ROM or in rewritable format, such as, for example, rewritable CD and DVD. They may be contrasted with memory devices, such as random access memory (RAM), read only memory (ROM), programmable read only memory (PROM), erasable programmable read only memory (EPROM), electrically erasable programmable read only memory (EEPROM), and flash memory devices.

Duplicating electronic information (step 1030) generally includes copying the identified electronic information from the source storage medium to a destination storage medium that is more accessible to an access requestor. Storage of the electronic information on the destination storage medium generally enables faster access to electronic information than would otherwise be available if the electronic information remained stored only on the source storage medium.

Providing an access requestor with access to the duplicated electronic information (step 1040) generally includes making the electronic information stored on the destination storage medium available to the access requestor. For example, an access requestor may be allowed to identify, read, copy and/or perceive the existence of the electronic information on the destination storage medium. When the access requestor is allowed to perceive the electronic information, the access requestor may be sent a notice that the copied electronic information is available at the destination storage medium. The access requestor also may be provided with a link to the electronic information on the destination storage medium. This link may be perceivable to the access requestor (e.g., displayed on the screen of the access requestor). If the access requestor is unable to access the selected information from the destination storage medium, than providing an access requestor with access also may include making the selected electronic information available to the access requestor from the source storage medium.

Figure 2A:
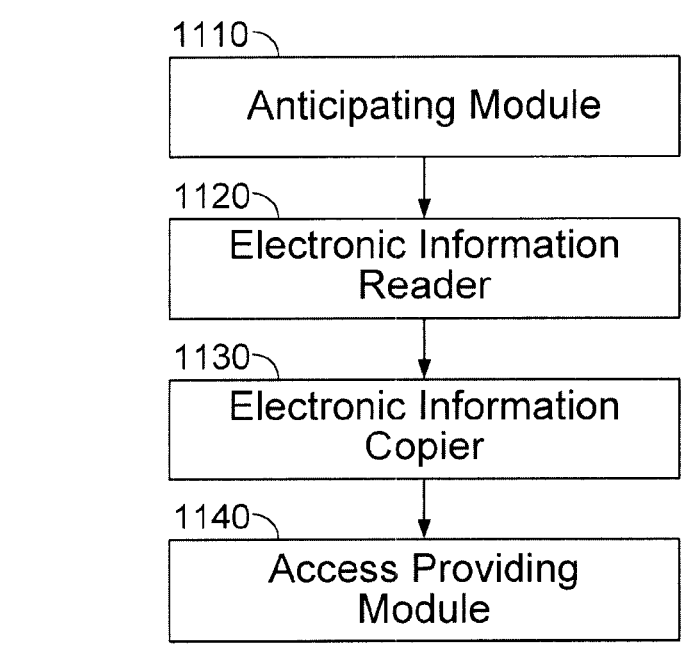
FIG. 2a is a block diagram of a system for making electronic information more readily available to an access requestor.

FIG. 2a is a block diagram that illustrates an exemplary system 1100 for making electronic information more readily available to an access requestor, based, for example, on an anticipated demand for the electronic information. The system 1100 of FIG. 2a includes several interconnected components including an anticipating module 1110, an electronic information reader 1120, an electronic information copier 1130, and an access providing module 1140. One or more of these components may be embodied by computer programming and operated by code (i.e., software) in a computer system, as will be described.

The anticipating module 1110 generally includes a segment of software code that is designed to predict requests for electronic information stored on an accessible source storage medium. For example, the software code may be designed to store requests for electronic information or to access a data storage device (located on the Web or otherwise) that stores requests for electronic information. The software may be designed to measure the stored data to determine the rate or number of requests for the electronic information and the file size of the electronic. The software also may calculate a cache value based on the number of requests and the file size, and to electronically flag the electronic information as being in high demand by access requestors where the cache value or frequency of requests for the electronic information is high. The anticipating module 1110 may predict requests for electronic information based on any or all of the criteria described with reference to step 1010 of FIG. 1.

The electronic information reader 1120 generally includes a segment of software code capable of identifying requested electronic information from within the source storage medium. The electronic information reader 1120 may identify requested electronic information based on any or all of the criteria described with reference to step 1020 of FIG. 1.

The electronic information copier 1130 generally includes a segment of software code capable of copying electronic information from the source storage medium to a destination storage medium that is more accessible to an access requestor. The electronic information copier may copy electronic information based on any or all of the criteria described with reference to step 1030 of FIG. 1.

The access providing module 1140 generally includes a segment of software code capable of making available to an access requestor the electronic information that has been stored on a destination storage medium. The access providing module 1140 may provide access to electronic information based on any or all of the criteria described with reference to step 1040 of FIG. 1. The access providing module 1140 may also determine whether access to the electronic information has been made available to the access requestor from the destination storage medium; otherwise, the electronic information may be provided to the access requestor from the source storage medium.

Relative to the access requestor, the destination storage medium may be less remote than the source storage medium. The destination storage medium may be logically, physically or geographically closer to the access requestor than the source storage medium. For example, the destination storage medium may be storage on a distributed server and the source storage medium may be storage that is accessible to the access requestor through the distributed server. Storage of the electronic data on the destination storage medium generally results in faster or more efficient access to desired electronic information than if the information was stored on the source storage medium.

While described as segments of software code, any or all of steps 1110-1140 may be implemented as hardware. For instance, when implemented using hardware, the electronic information reader 1120 may include, e.g., a magnetic disk reader, a magneto-optical disk reader, an optical disk reader, or a CD-ROM reader. Similarly, when implemented using hardware, the electronic information copier may include a magnetic disk copier, a magneto-optical disk copier, an optical disk copier, or a CD-ROM copier.

Figure 2B:
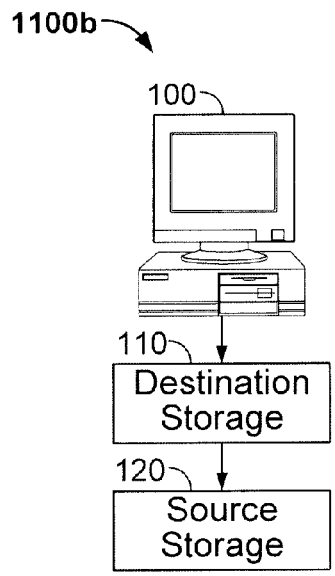
FIGS. 2b-2d are block diagrams of computer systems that each include a source storage medium and a destination storage medium.
Figure 2C:
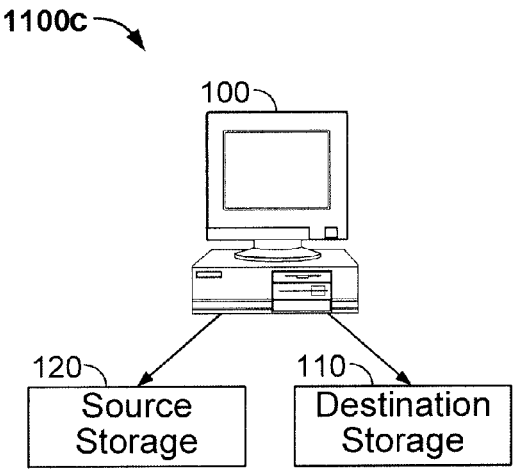
Figure 2D:
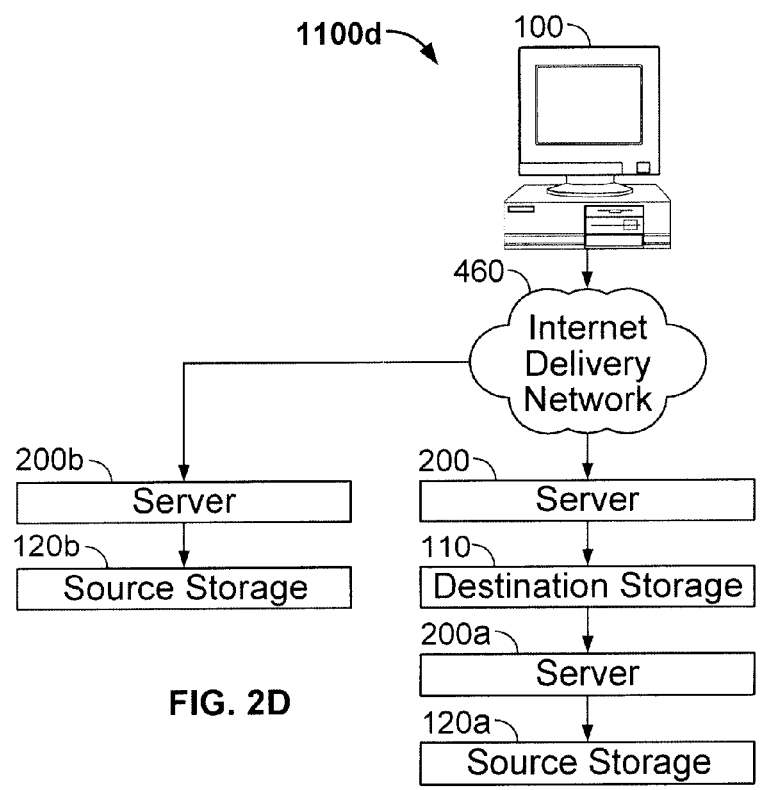

In addition, to illustrate how the destination and source medium are interrelated, examples of various hardware configurations of a system for making electronic information more readily available to an access requestor are shown in FIGS. 2b-2d. FIG. 2b shows a computer system used by an access requestor 100 that includes a source storage medium 120, and a destination storage medium 110. As shown from FIG. 2b, the destination storage medium 110 is logically and electronically closer to the access requestor 100 than the source storage medium 120. Thus, storing the electronic information on the destination storage medium 110 allows the access requestor 100 to access the electronic information faster than if the information was stored on the source storage medium 120.

FIG. 2c shows another exemplary configuration of a computer system 1100c including an access requestor 100, a source storage medium 120, and a destination storage medium 110. In this illustration, the source storage medium 120 is physically and/or geographically further from the access requestor 100 than the destination storage medium 110. In other instances, regardless of whether the source and destination storage mediums 120 and 110 are similarly situated by distance and/or geographical relationship to the access requestor 100, this type of configuration may be used when the anticipated or actual demands for access to electronic information on the destination storage medium 110 are lower than the anticipated or actual demands for access to electronic information stored on the source storage medium 120.

FIG. 2d shows yet another exemplary configuration of a computer system 1100d including an access requestor 100, source storage medium 120a, 120b, a destination storage medium 110, servers 200, 200a, 200b, and a delivery network 460. Examples of a delivery network 460 may include the Internet, the World Wide Web, WANs, LANs, analog or digital wired and wireless telephone networks (e.g., PSTN, ISDN, and xDSL), radio, television, cable, satellite, and/or any other delivery mechanism for carrying data. As shown in FIG. 2d, the delivery network 460 and servers 200, 200a, 200b connect the source storage media 120a, 120b and the destination storage medium 110 to the Internet. In one implementation, an access request by the access requestor 100 is transmitted by the delivery network 460 to a server 200 that directs the request to the destination storage medium 110. The electronic information is routed from the source storage medium 120a through a server 200a to the destination storage medium 110. In another implementation, the electronic information is routed from the source storage medium 120b through a server 200b through the delivery network 460 to the destination storage medium 110, where the destination storage medium 110 is electronically closer to the access requestor than the source storage medium 120b. By making the electronic information available on the destination storage medium 110, the access request is processed faster since the destination storage medium 110 is electronically closer to the access requestor 100.

Figure 3:
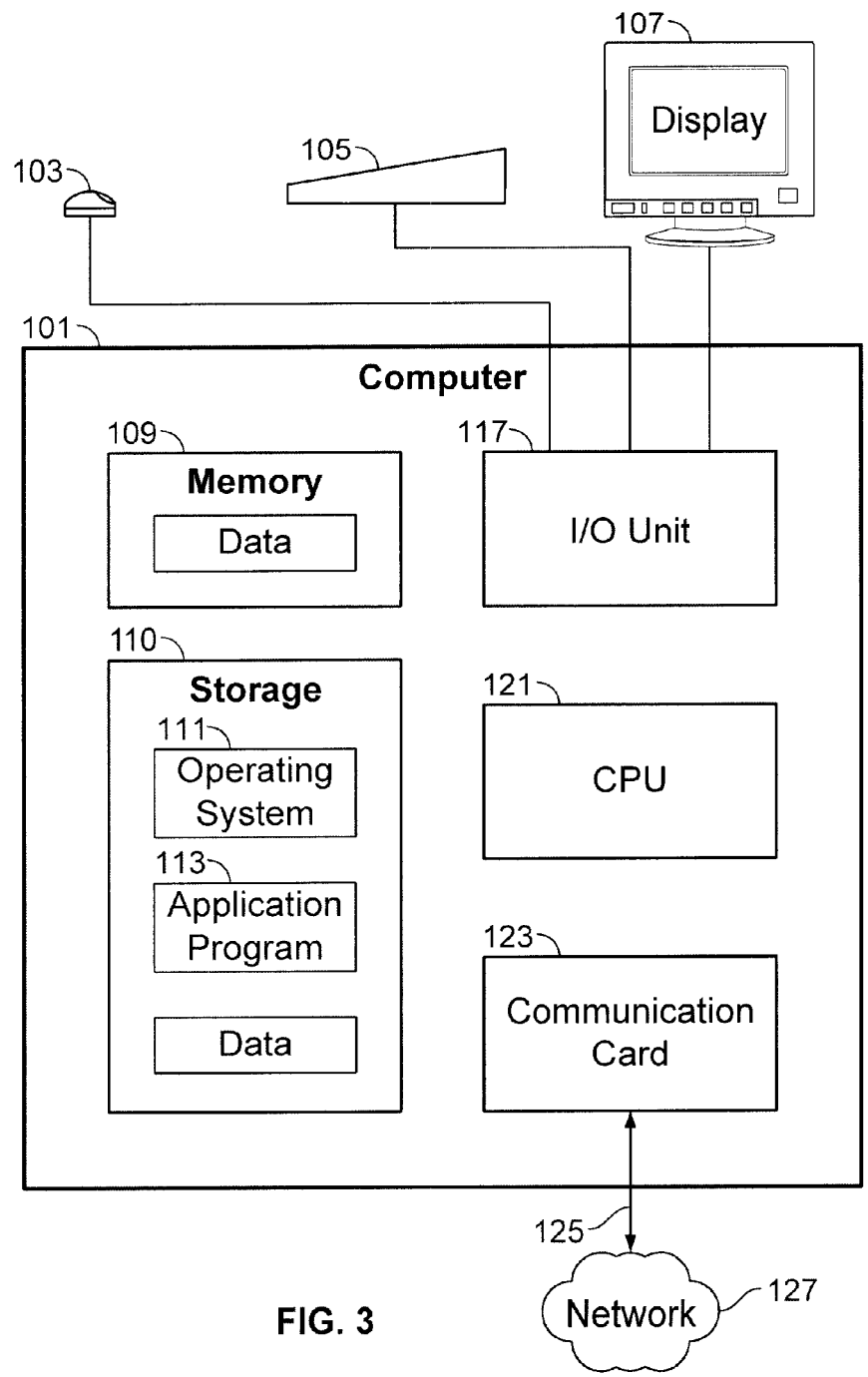
FIG. 3 is a block diagram of hardware structured and arranged to execute software capable of performing one or more of the steps of a process for making electronic information readily available to an access requestor.

The method for making electronic information readily available to an access requestor 100 can be embodied on one or more computer systems 101. For example, the computer system 101 illustrated in FIG. 3 represents a typical hardware setup for executing software capable of performing one or more of the steps of a process for making electronic information readily available to an access requestor, e.g., the process shown by FIG. 1. As such, the computer system 101 of FIG. 3 allows an access requestor 100 to perform tasks such as communicating with other computer users, accessing various computer resources, and viewing, creating, or otherwise manipulating electronic information. In this manner, the computer system 101 of FIG. 3 may be programmed with computer-readable instructions to enable content to be perceived (e.g., viewed) without being captured (e.g., copied, saved, or printed).

The system includes various input/output (I/O) devices (mouse 103, keyboard 105, display 107) and a general purpose computer 100 having a central processor unit (CPU) 121, an I/O unit 117, a memory device 109, and a storage medium 110 that stores data and various programs, such as an operating system 111, and one or more application programs 113. The computer system 100 may also include a communications card or device 123 (e.g., a modem or network adapter) for exchanging data with a network 127 through a communications link 125 (e.g., a telephone line).

Figure 4:
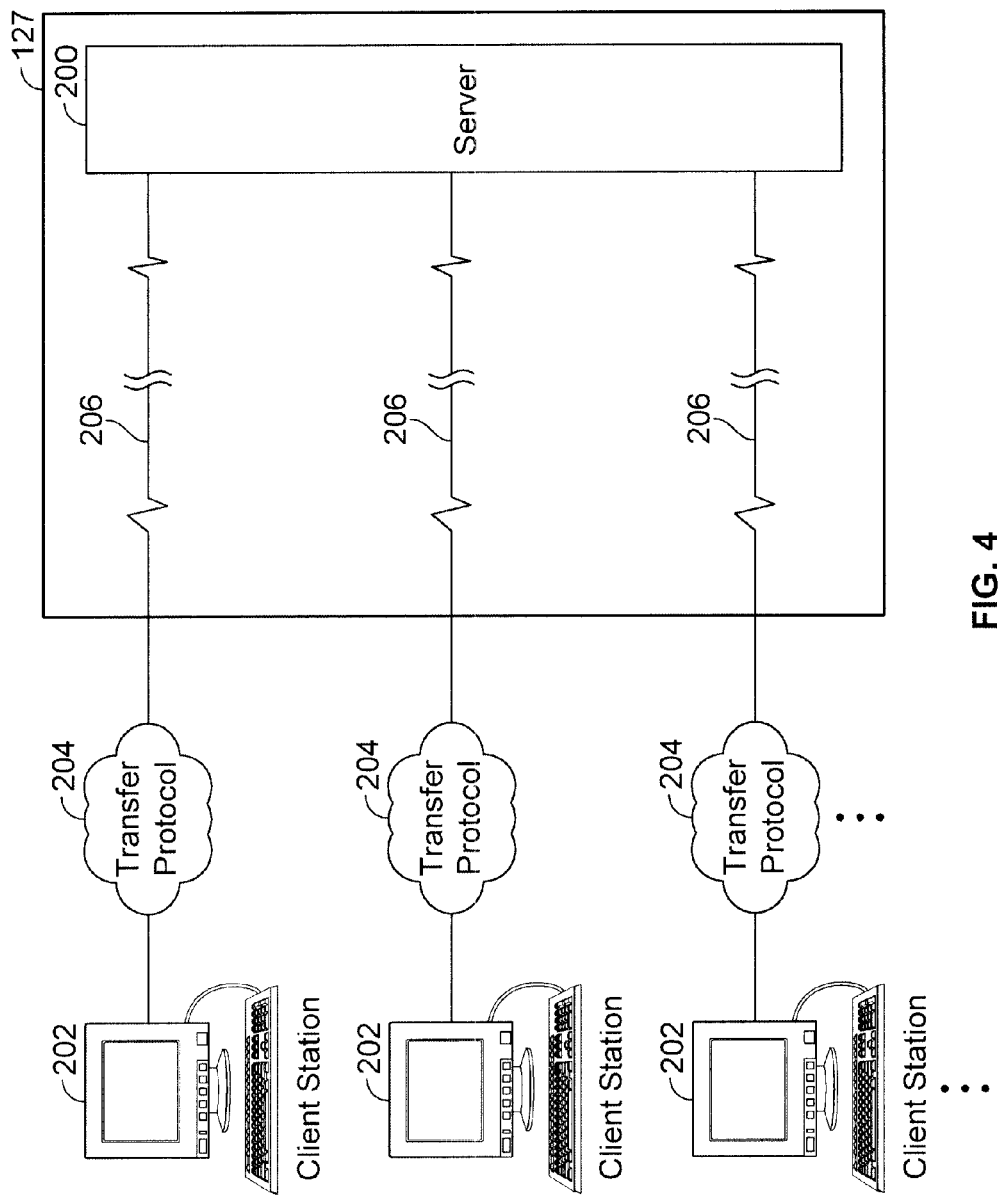
FIG. 4 is a block diagram of a computer system for using a network to access electronic content or other resources at a source or destination storage medium.

As shown in FIG. 4, using a network 127, an access requestor 100 of a computer system 101 can access electronic content or other resources at a source or destination storage medium 120 or 110 by accessing other client systems 202 (e.g., personal or laptop computers), or at one or more server systems 200. An example of a server system 200 is a distributed computer that provides subscribers with online computer data and services such as e-mail, e-commerce, chat rooms, Internet access, electronic newspapers and magazines, etc.

Users of a host computer's online services typically communicate with one or more central server systems 200 through client software executing on their respective client systems 202. In practice, server system 200 is not typically a single monolithic entity but rather is typically a network of interconnected server computers, possibly physically dispersed from each other, each dedicated to its own set of duties and/or to a particular geographical region. In such a case, the server computers are interconnected by a network of communication links.

Client systems 202 run client software that enables communication with corresponding software running on the server system 200. The client systems 202 communicate with the server system 200 through various channels 204 and lines 206, such as a modem connected to a telephone line, a direct Internet connection using a transfer protocol such as TCP/IP (Transfer Control Protocol/Internet Protocol), cable, integrated services digital network (ISDN), or other transfer protocols. The server system 200 is responsible for receiving input from the client systems 202, manipulating the collective body of input information (and possibly information from other sources) into a useful format, and retransmitting the formatted information back to one or more clients 202 for output on an output device, such as a display screen.

A "browser" is an example of client software that enables access requestors to access and view electronic content stored either locally or remotely, such as in a network environment of interconnected computer systems (e.g., delivery network 460 of FIG. 2*d*). The browser typically is used for displaying documents described in Hyper-Text Markup Language (HTML). It is generally stored on servers connected to a network such as the Internet. An access requestor instructs the browser to access an electronic document (e.g., "webpage") by specifying a network address, e.g., Uniform Resource Locator (URL), indicating the location of a desired webpage. In response, the browser contacts the corresponding server 200 hosting the requested webpage, retrieves the one or more files that make up the webpage, and then displays the webpage in a window on the access requestor's computer screen.

Figure 5:
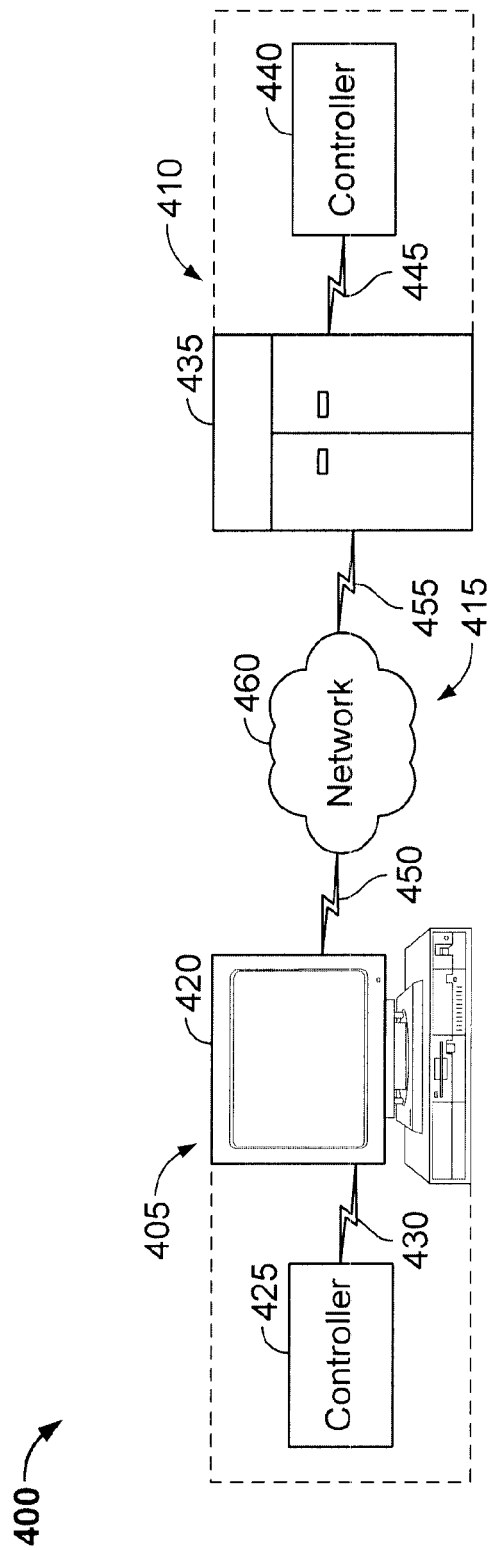
FIG. 5 is a block diagram of a system capable of being programmed for making electronic information readily available to an access provider.

Referring to FIGS. 5-10, another implementation of a system capable of being programmed (e.g., according to the process shown by FIG. 1) for making electronic information readily available to an access provider is described. In FIG. 5, a communications system 400 is delivering and exchanging data between a client system 405 and a host system 410 through a communications link 415. The client system 405 typically includes one or more client devices 420 and/or client controllers 425. For example, the client system 405 may include one or more general-purpose computers, such as, for example, personal computers, one or more special-purpose computers, such as, for example, devices specifically programmed to communicate with each other and/or the host system 410, or a combination of one or more general-purpose computers and one or more special-purpose computers. The client system 405 may be arranged to operate within or in concert with one or more other systems, such as e.g., one or more Local Area Networks (LANs) and/or one or more Wide Area Networks (WANs).

The client device 420 is generally capable of executing instructions under the command of a client controller 425. The client device 420 is connected to the client controller 425 by a wired or wireless data pathway 430 capable of delivering data.

The client device 420 and client controller 425 each typically includes one or more hardware components and/or software components. An example of a client device 420 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions. An example of client controller 425 is a software application loaded on the client device 420 for commanding and directing communications enabled by the client device 420. Other examples include a program, a piece of code, an instruction, a device, a computer, a computer system, or a combination thereof, for independently or collectively instructing the client device 420 to interact and operate as described herein. The client controller 425 may be embodied permanently or temporarily in any type of machine, component, physical or virtual equipment, storage medium 110, or propagated signal capable of providing instructions to the client device 420.

The communications link 415 typically includes a delivery network 460 making a direct or indirect communication between the client system 405 and the host system 410, irrespective of physical separation. The communications link 415 may include communication pathways 450, 455 that enable communications through the one or more delivery networks 460 described above. Each of the communication pathways 450, 455 may include, e.g., a wired, wireless, cable or satellite communication pathway.

The host system 410 includes a host device 435 capable of executing instructions under the command and direction of a host controller 440. The host device 435 is connected to the host controller 440 by a wired or wireless data pathway 445 capable of carrying and delivering data.

The host system 410 typically includes one or more host devices 435 and/or host controllers 440. For example, the host system 410 may include one or more general-purpose computers (e.g., personal computers), one or more special-purpose computers (e.g., devices specifically programmed to communicate with each other and/or the client system 405), or a combination of one or more general-purpose computers and one or more special-purpose computers. The host system 410 may be arranged to operate within or in concert with one or more other systems, such as, e.g., one or more LANs and/or one or more WANs.

The host device 435 and host controller 440 each typically includes one or more hardware components and/or software components. An example of a host device 435 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions. An example of host controller 440 is a software application loaded on the host device 435 for commanding and directing communications enabled by the host device 435. Other examples include a program, a piece of code, an instruction, a device, a computer, a computer system, or a combination thereof, for independently or collectively instructing the host device 435 to interact and operate as described herein. The host controller 440 may be embodied permanently or temporarily in any type of machine, component, physical or virtual equipment, storage medium, or propagated signal capable of providing instructions to the host device 435.

Figure 6:
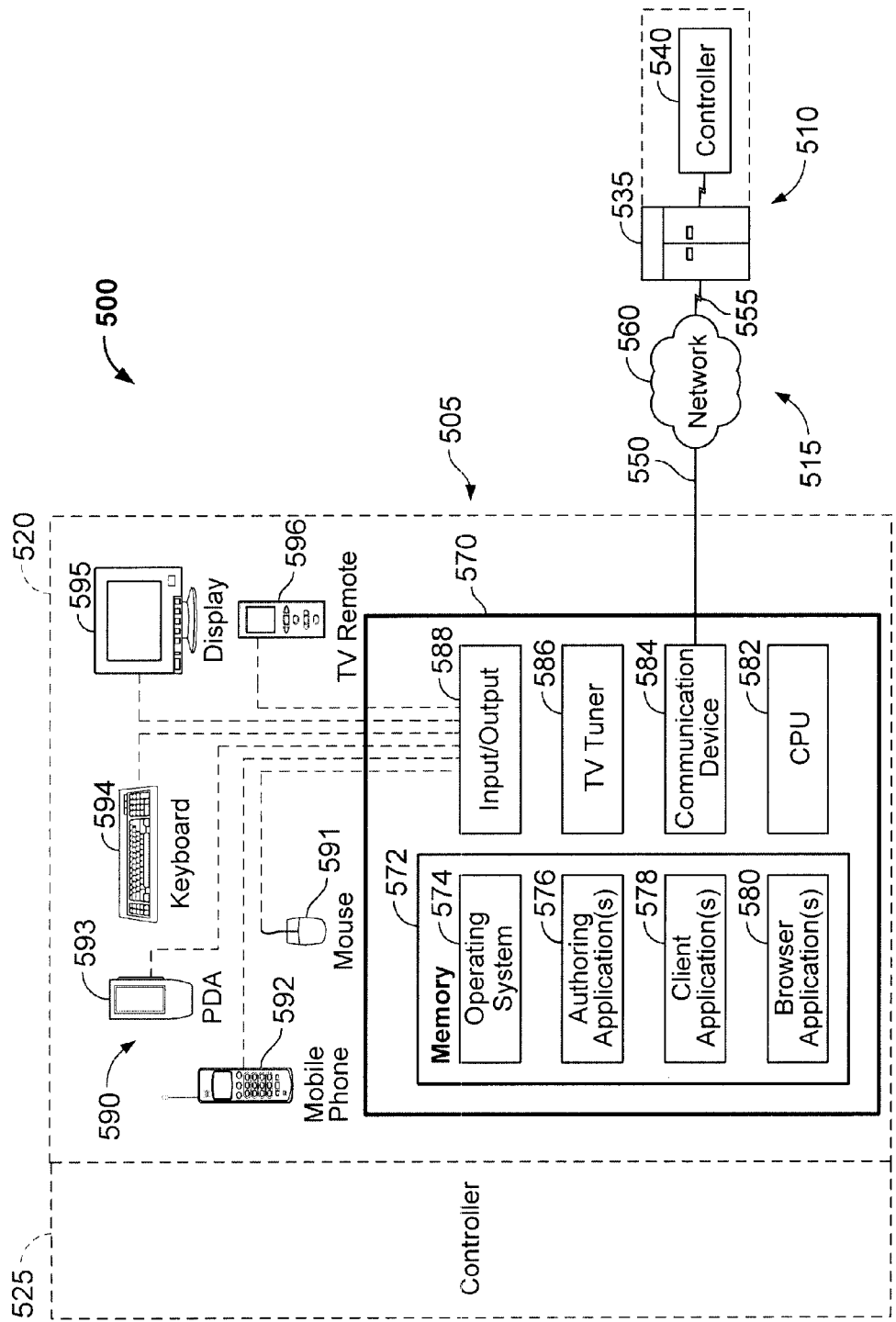
FIG. 6 is a block diagram of a communication system including a client system communicating with a host system through a communications link.

FIG. 6 illustrates a communication system 500 including a client system 505 communicating with a host system 510 through a communications link 515. Client system 505 typically includes one or more client devices 520 and one or more client controllers 525 for controlling the client devices 520. Host system 510 typically includes one or more host devices 535 and one or more host controllers 540 for controlling the host devices 535. The communications link 515 may include communication pathways 550, 555 enabling communications through the one or more delivery networks 560.

Examples of each element within the communication system of FIG. 6 are broadly described above with respect to FIG. 5. In particular, the host system 510 and communications link 515 typically have attributes comparable to those described with respect to host system 410 and communications link 415 of FIG. 4, respectively. Likewise, the client system 505 of FIG. 6 typically has attributes comparable to and may illustrate one possible implementation of the client system 405 of FIG. 5.

The client device 520 typically includes a general purpose computer 570 having an internal or external storage 572 for storing data and programs such as an operating system 574

(e.g., DOS, Windows™, Windows™, Windows 95™, Windows 2000™, Windows NT™, OS/2, and Linux) and one or more application programs. Examples of application programs include authoring applications 576 (e.g., word processing, database programs, spreadsheet programs, and graphics programs) capable of generating documents or other electronic content; client applications 578 (e.g., AOL client, CompuServe client, AIM client, AOL TV client, and ISP client) capable of communicating with other computer users, accessing various computer resources, and viewing, creating, or otherwise manipulating electronic content; and browser applications 580 (e.g., Netscape's Navigator and Microsoft's Internet Explorer) capable of rendering standard Internet content.

The general-purpose computer 570 also includes a central processing unit (CPU) 582 for executing instructions in response to commands from the client controller 525. In one implementation, the client controller 525 includes one or more of the application programs installed on the internal or external storage 572 of the general-purpose computer 570. In another implementation, the client controller 525 includes application programs externally stored in and performed by one or more device(s) external to the general-purpose computer 570.

The general-purpose computer typically will include a communication device 584 for sending and receiving data. One example of the communication device 584 is a modem. Other examples include a transceiver, a set-top box, a communication card, a satellite dish, an antenna, or another network adapter capable of transmitting and receiving data over the communications link 515 through a wired or wireless data pathway 550. The general-purpose computer 570 also may include a television (TV) tuner 586 for receiving television programming in the form of broadcast, satellite, and/or cable TV signals. As a result, the client device 520 can selectively and/or simultaneously display network content received by communications device 584 and television programming content received by the TV tuner 586.

The general-purpose computer 570 typically will include an input/output interface 588 to enable a wired or wireless connection to various peripheral devices 590. Examples of peripheral devices 590 include, but are not limited to, a mouse 591, a mobile phone 592, a personal digital assistant (PDA) 593, a keyboard 594, a display monitor 595 with or without a touch screen input, and/or a TV remote control 596 for receiving information from and rendering information to subscribers. Other examples may include voice recognition and synthesis devices.

Although FIG. 6 illustrates devices such as a mobile telephone 592, a PDA 593, and a TV remote control 596 as being peripheral with respect to the general-purpose computer 570, in another implementation, such devices may themselves include the functionality of the general-purpose computer 570 and operate as the client device 520. For example, the mobile phone 592 or the PDA 593 may include computing and networking capabilities and function as a client device 520 by accessing the delivery network 560 and communicating with the host system 510. Furthermore, the client system 505 may include one, some or all of the components and devices described above.

Figure 7:
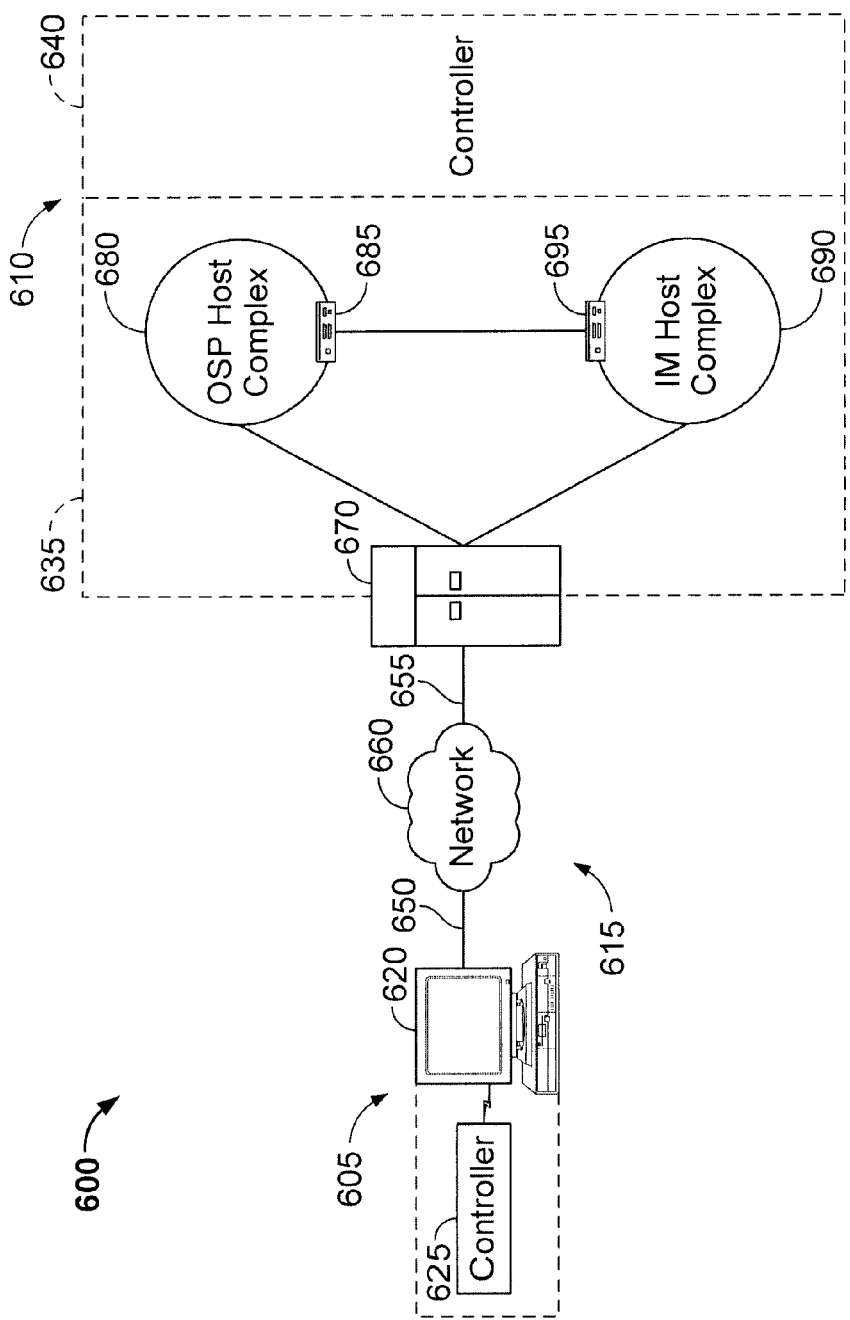
FIGS. 7-10 are block diagrams of communications systems that are capable of delivering and exchanging information between a client system and a host system through a communication link.

Referring to FIG. 7, a communications system 600 is capable of delivering and exchanging information between a client system 605 and a host system 610 through a communication link 615. Client system 605 typically includes one or more client devices 620 and one or more client controllers 625 for controlling the client devices 620. Host system 610 typically includes one or more host devices 635 and one or more host controllers 640 for controlling the host devices 635. The communications link 615 may include communication pathways 650, 655 enabling communications through the one or more delivery networks 660.

Examples of each element within the communication system of FIG. 7 are broadly described above with respect to FIGS. 5 and 6. In particular, the client system 605 and the communications link 615 typically have attributes comparable to those described with respect to client systems 405 and 505 and communications links 415 and 515 of FIGS. 5 and 6, respectively. Likewise, the host system 610 of FIG. 7 may have attributes comparable to and may illustrate one possible implementation of the host systems 410 and 510 shown in FIGS. 5 and 6, respectively.

The host system 610 includes a host device 635 and a host controller 640. The host controller 640 is generally capable of transmitting instructions to any or all of the elements of the host device 635. For example, in one implementation, the host controller 640 includes one or more software applications loaded on the host device 635. However, in other implementations, as described above, the host controller 640 may include any of several other programs, machines, and devices operating independently or collectively to control the host device 635.

The host device 635 includes a login server 670 for enabling access by subscribers and routing communications between the client system 605 and other elements of the host device 635. The host device 635 also includes various host complexes such as the depicted Online Service Provider (OSP) host complex 680 and Instant Messaging (IM) host complex 690. To enable access to these host complexes by subscribers, the client system 605 may include communication software, e.g., an OSP client application and an IM client application. The OSP and IM communication software applications are designed to facilitate the subscriber's interactions with the respective services and, in particular, may provide access to all the services available within the respective host complexes. For example, Instant Messaging allows a subscriber to use the IM client application to view whether particular subscribers (buddies) are online, exchange instant messages with particular subscribers, participate in group chat rooms, trade files such as pictures, invitations or documents, find other subscribers with similar interests, get customized news and stock quotes, and search the Web.

Typically, the OSP host complex 680 supports different services, such as email, discussion groups, chat, news services, and Internet access. The OSP host complex 680 is generally designed with an architecture that enables the machines within the OSP host complex 680 to communicate with each other, certain protocols (that is, standards, formats, conventions, rules, and structures) being employed to enable the transfer of data. The OSP host complex 680 ordinarily employs one or more OSP protocols and custom dialing engines to enable access by selected client applications. The OSP host complex 680 may define one or more specific protocols for each service based on a common, underlying proprietary protocol.

The IM host complex 690 is generally independent of the OSP host complex 680, and supports instant messaging services regardless of a subscriber's network or Internet access. Thus, the IM host complex 690 allows subscribers to send and receive instant messages, whether or not they have access to any particular ISP. The IM host complex 690 may support associated services, such as administrative matters, advertising, directory services, chat, and interest groups related to the instant messaging. The IM host complex 690 has an architecture that enables all of the machines within the IM host complex to communicate with each other. To transfer data, the IM host complex 690 employs one or more standard or exclusive IM protocols.

The host device 635 may include one or more gateways that connect and therefore link complexes, such as the OSP host complex gateway 685 and the IM host complex gateway 695. The OSP host complex gateway 685 and the IM host complex 695 gateway may directly or indirectly link the OSP host complex 680 with the IM host complex 690 through a wired or wireless pathway. Ordinarily, when used to facilitate a link between complexes, the OSP host complex gateway 685 and the IM host complex gateway 695 are privy to information regarding a protocol anticipated by a destination complex, which enables any necessary protocol conversion to be performed incident to the transfer of data from one complex to another. For instance, the OSP host complex 680 and IM host complex 690 may use different protocols such that transferring data between the complexes requires protocol conversion by or at the request of the OSP host complex gateway 685 and/or the IM host complex gateway 695.

Figure 8:
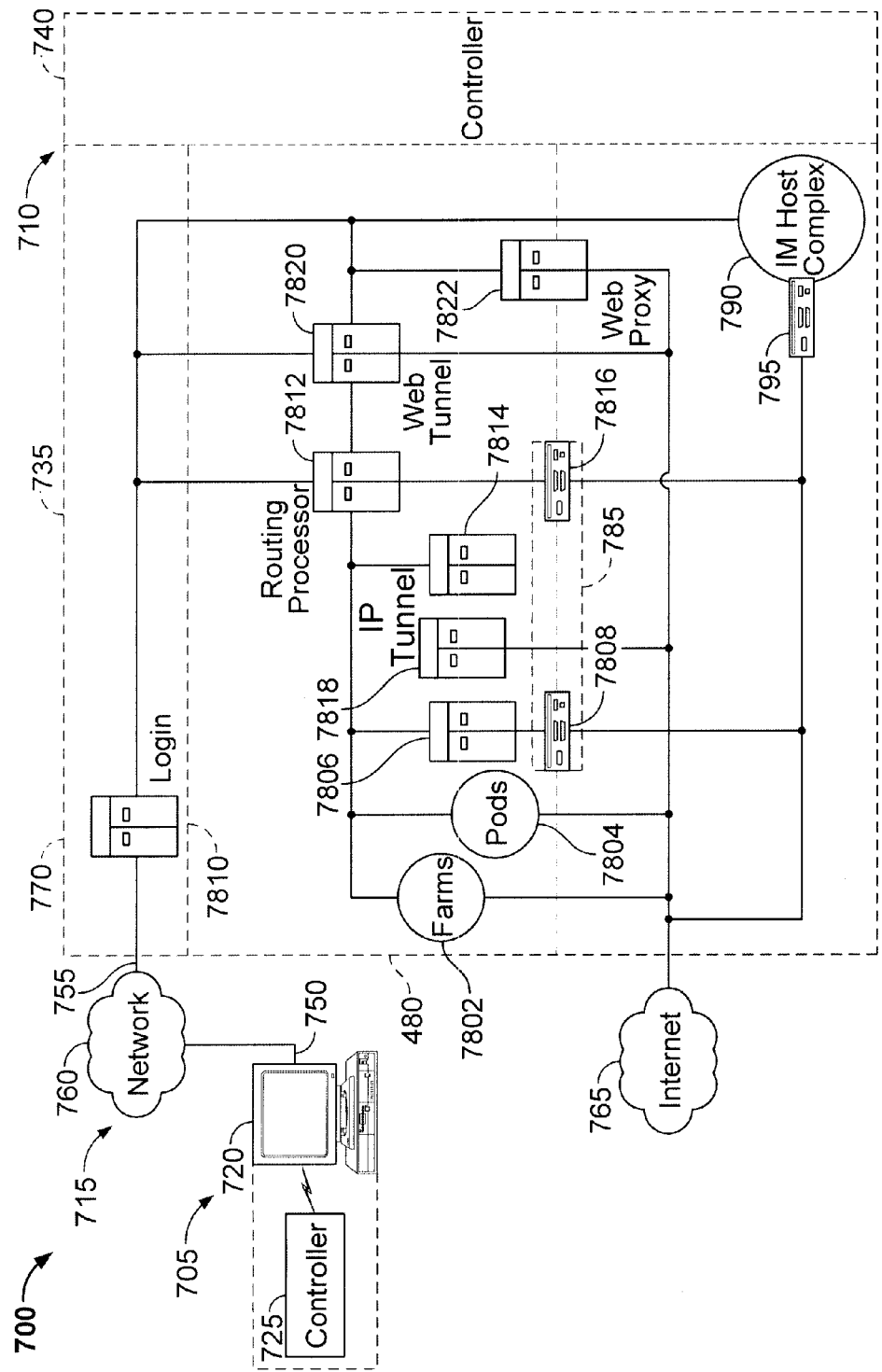

Referring to FIG. 8, a communications system 700 is capable of delivering and exchanging information between a client system 705 and a host system 710 through a communication link 715. Client system 705 typically includes one or more client devices 720 and one or more client controllers 725 for controlling the client devices 720. Host system 710 typically includes one or more host devices 735 and one or more host controllers 740 for controlling the host devices 735. The communications link 715 may include communication pathways 750, 755 enabling communications through the one or more delivery networks 760. As shown, the client system 705 may access the Internet 765 through the host system 710.

Examples of each element within the communication system of FIG. 8 are broadly described above with respect to FIGS. 5-7. In particular, the client system 705 and the communications link 715 typically have attributes comparable to those described with respect to client systems 405, 505, and 605 and communications links 415, 515, and 615 of FIGS. 5-7, respectively. Likewise, the host system 710 of FIG. 8 may have attributes comparable to and may illustrate one possible implementation of the host systems 410, 510, and 610 shown in FIGS. 5-7, respectively. However, FIG. 8 describes an aspect of the host system 710, focusing primarily on one particular implementation of OSP host complex 780.

The client system 705 includes a client device 720 and a client controller 725. The client controller 725 is generally capable of establishing a connection to the host system 710, including the OSP host complex 780, the IM host complex 790 and/or the Internet 765. In one implementation, the client controller 725 includes an OSP application for communicating with servers in the OSP host complex 780 using OSP protocols that may or may not be exclusive or proprietary. The client controller 725 also may include applications, such as an IM client application and/or an Internet browser application, for communicating with the IM host complex 790 and the Internet 765.

The host system 710 includes a host device 735 and a host controller 740. The host controller 740 is generally capable of transmitting instructions to any or all of the elements of the host device 735. For example, in one implementation, the host controller 740 includes one or more software applications loaded on one or more elements of the host device 735. However, in other implementations, as described above, the host controller 740 may include any of several other programs, machines, and devices operating independently or collectively to control the host device 735.

The host device 735 includes a login server 770 capable of enabling communications between client systems 705 and various elements of the host system 710, including elements such as OSP host complex 780 and IM host complex 790. The login server 770 may implement one or more authorization procedures to enable simultaneous access to one or more of these elements.

The OSP host complex 780 and the IM host complex 790 are typically connected through one or more OSP host complex gateways 785 and one or more IM host complex gateways 795. Each OSP host complex gateway 785 and IM host complex gateway 795 may generally perform protocol conversions necessary to enable communication between one or more of the OSP host complex 780, the IM host complex 790, and the Internet 765.

The OSP host complex 780 supports a set of services to be accessed through and/or performed by from one or more servers located internal to and external from the OSP host complex 780. Servers external to the OSP host complex 780 may communicate using the Internet 765. Servers internal to the OSP complex 780 may be arranged in one or more configurations. For example, servers may be arranged in large centralized clusters identified as farms 7802 or in localized clusters identified as pods 7804.

More specifically, farms 7802 are groups of servers located at centralized locations within the OSP host complex 780. Farms 7802 generally are dedicated to providing particular functionality and services to subscribers and clients from a centralized location, regardless of the location of the subscriber or client. Farms 7802 are particularly useful for providing services that depend upon other remotely-located or performed processes and services for information, such as, e.g., chat, email, instant messaging, news, newsgroups, search, stock updates, and weather. Thus, farms 7802 tend to rely on connections with external resources such as the Internet 765 and/or other servers within the OSP host complex 780.

By contrast to farms 7802, pods 7804 are clusters of localized servers that provide some services offered by the OSP host complex 780 from a location local to the service or information recipient, thus reducing and avoiding time delays and congestion inherent in centralized processing. Each pod 7804 includes one or more interrelated servers capable of operating together to provide one or more services offered by the OSP host complex 780 in a geographically localized manner, the servers within a pod 7804 generally operating independently rather than relying on resources external to the pod 7804 to operate. A pod 7804 may cache content received from external sources, such as farms 7802 or the Internet 765, making frequently requested information readily available to the local service or information recipients served by the pod 7804. In this way, pods 7804 are particularly useful in providing services that are independent of other processes and servers such as, e.g., routing to other localized resources or recipients, providing access to keywords and geographically specific content, providing access to routinely accessed information, and downloading certain software and graphical interface updates with reduced processing time and congestion. The determination of which servers and processes are located in the pod 7804 is made by the OSP according to load distribution, frequency of requests, demographics, and other factors.

In addition to farms 7802 and pods 7804, the implementation of FIG. 7 also includes one or more non-podded and non-farmed servers 7806. In general, the servers 7806 may be dedicated to performing a particular service or information that relies on other processes and services for information and may be directly or indirectly connected to resources outside of the OSP host complex 780, such as the Internet 765 and the IM host complex 790, through an OSP gateway 7808 within OSP host complex gateway 785. In the event that subscriber usage of a particular service or information of the servers 7806 becomes relatively high, those servers 7806 may be integrated into a farm or pod as appropriate.

In the implementation of FIG. 8, one particular exemplary pod 7810 is shown in more detail. Pod 7810 includes a routing processor 7812. In a packet-based implementation, the client system 705 may generate information requests, convert the requests into data packets, sequence the data packets, perform error checking and other packet-switching techniques, and transmit the data packets to the routing processor 7812. Upon receiving data packets from the client system 705, the routing processor 7812 may directly or indirectly route the data packets to a specified destination within or outside of the OSP host complex 780. In general, the routing processor 7812 will examine an address field of a data request, use a mapping table to determine the appropriate destination for the data request, and direct the data request to the appropriate destination.

For example, in the event that a data request from the client system 705 can be satisfied locally, the routing processor 7812 may direct the data request to a local server 7814 in the pod 7810. In the event that the data request cannot be satisfied locally, the routing processor 7812 may direct the data request internally to one or more farms 7802, one or more other pods 7804, or one or more non-podded servers 7806 in the OSP host complex 780, or the routing processor 7812 may direct the data request externally to elements such as the IM host complex 790 through an OSP/pod gateway 7816.

The routing processor 7812 also may direct data requests and/or otherwise facilitate communication between the client system 705 and the Internet 765 through the OSP/pod gateway 7816. In one implementation, the client system 705 uses an OSP client application to convert standard Internet content and protocols into OSP protocols and vice versa, where necessary. For example, when a browser application transmits a request in a standard Internet protocol, the OSP client application can intercept the request, convert the request into an OSP protocol and send the converted request to the routing processor 7812 in the OSP host complex 780. The routing processor 7812 recognizes the Internet 765 as the destination and routes the data packets to an Internet Protocol (IP) tunnel 7818. The IP tunnel 7818 converts the data from the OSP protocol back into standard Internet protocol and transmits the data to the Internet 765. The IP tunnel 7818 also converts the data received from the Internet in the standard Internet protocol back into the OSP protocol and sends the data to the routing processor 7812 for delivery back to the client system 705. At the client system 705, the OSP client application converts the data in the OSP protocol back into standard Internet content for communication with the browser application.

The IP tunnel 7818 may act as a buffer between the client system 705 and the Internet 765, and may implement content filtering and time saving techniques. For example, the IP tunnel 7818 can check parental controls settings of the client system 705 and request and transmit content from the Internet 765 according to the parental control settings. In addition, the IP tunnel 7818 may include a number a caches for storing frequently accessed information. If requested data is determined to be stored in the caches, the IP tunnel 7818 may send the information to the client system 705 from the caches and avoid the need to access the Internet 765.

In another implementation, the client system 705 may use standard Internet protocols and formatting to access pods 7810 and the Internet 765. For example, the subscriber can use an OSP TV client application having an embedded browser application installed on the client system 705 to generate a request in standard Internet protocol, such as HyperText Transport Protocol (HTTP). In a packet-based implementation, data packets may be encapsulated inside a standard Internet tunneling protocol, such as, e.g., User Datagram Protocol (UDP), and routed to a web tunnel 7820. The web tunnel 7820 may be a Layer Two Tunneling Protocol (L2TP) tunnel capable of establishing a point-to-point protocol (PPP) session with the client system 705. The web tunnel 7820 provides a gateway to the routing processor 7812 within the pod 7810, the Internet 765, and a web proxy 7822.

The web proxy 7822 can look up subscriber information from the IP address of the client system 705 to determine demographic information such as the subscriber's parental control settings. In this way, the web proxy 7822 can tailor the subscriber's content and user interfaces. The web proxy 7822 can also perform caching functions to store certain Uniform Resource Locators (URLs) and other electronic content so that the web proxy 7822 can locally deliver information to the client system 705 and avoid the need to access the Internet 765 in the event that data requested by the client system 705 has been cached.

Figure 9:
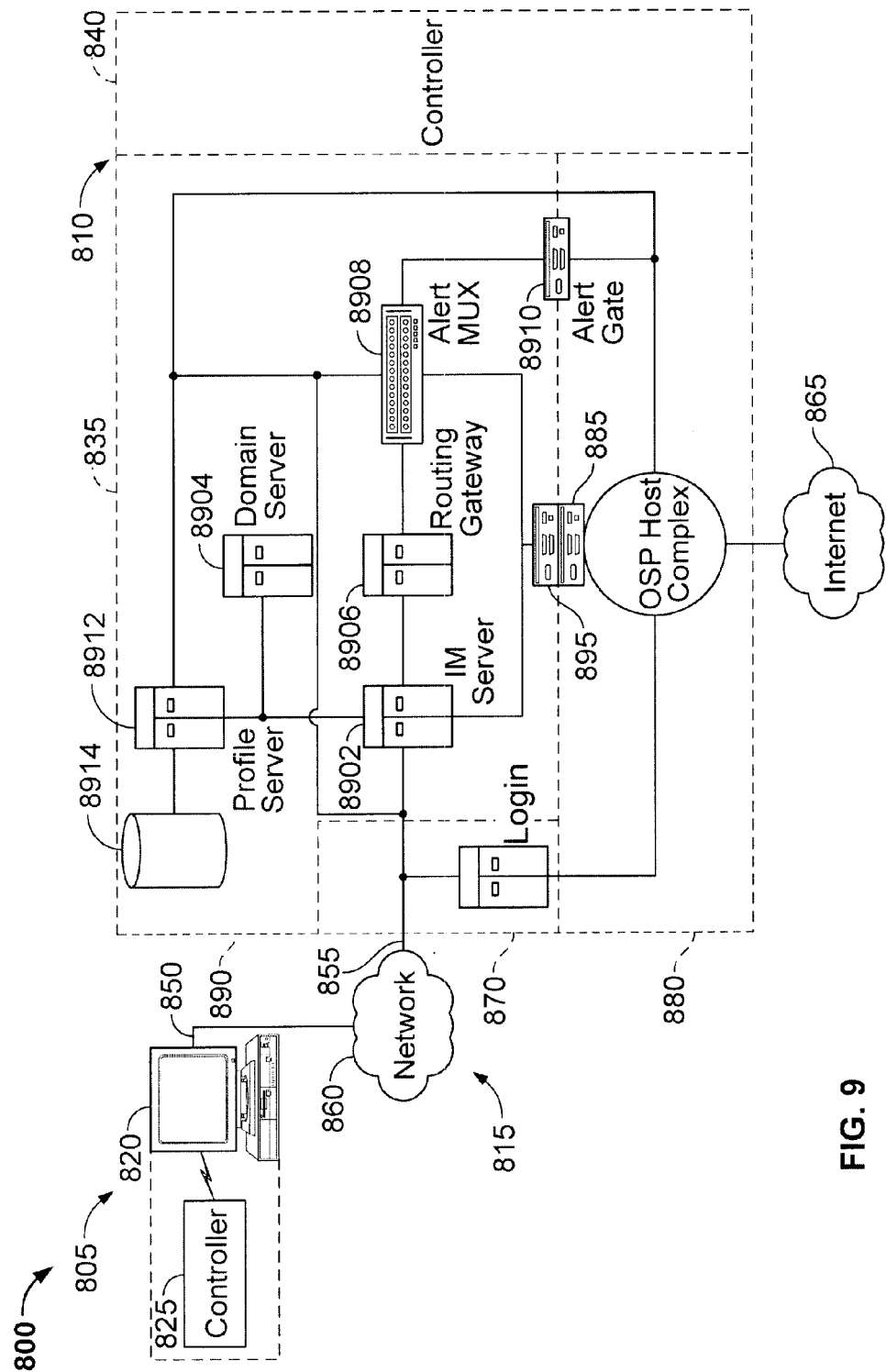

Referring to FIG. 9, a communications system 800 is capable of delivering and exchanging information between a client system 805 and a host system 810 through a communication link 815. Client system 805 typically includes one or more client devices 820 and one or more client controllers 825 for controlling the client devices 820. Host system 810 typically includes one or more host devices 835 and one or more host controllers 840 for controlling the host devices 835. The communications link 815 may include communication pathways 850, 855 enabling communications through the one or more delivery networks 860. As shown, the client system 805 may access the Internet 865 through the host system 810.

Examples of each element within the communication system of FIG. 9 are broadly described above with respect to FIGS. 5-8. In particular, the client system 805 and the communications link 815 typically have attributes comparable to those described with respect to client systems 405, 505, 605, and 705 and communications links 415, 515, 615, and 715 of FIGS. 5-8 respectively. Likewise, the host system 810 of FIG. 8 may have attributes comparable to and may illustrate one possible implementation of the host systems 410, 510, 610, and 710 shown in FIGS. 5-8, respectively. However, FIG. 9 describes an aspect of the host system 810, focusing primarily on one particular implementation of IM host complex 890.

The client system 805 includes a client device 820 and a client controller 825. The client controller 825 is generally capable of establishing a connection to the host system 810, including the OSP host complex 880, the IM host complex 890 and/or the Internet 865. In one implementation, the client controller 825 includes an IM application for communicating with servers in the IM host complex 890 utilizing exclusive IM protocols. The client controller 825 also may include applications, such as an OSP client application and/or an Internet browser application, for communicating with elements such as the OSP host complex 880 and the Internet 865.

The host system 810 includes a host device 835 and a host controller 840. The host controller 840 is generally capable of transmitting instructions to any or all of the elements of the host device 835. For example, in one implementation, the host controller 840 includes one or more software applications loaded on one or more elements of the host device 835. However, in other implementations, as described above, the host controller 840 may include any of several other programs, machines, and devices operating independently or collectively to control the host device 835.

The host system 810 includes a login server 870 capable of enabling communications between client systems 805 and various elements of the host system 810, including elements such as the OSP host complex 880 and IM host complex 890; login server 870 is also capable of authorizing access by the client system 805 and those elements. The login server 870 may implement one or more authorization procedures to enable simultaneous access to one or more of the elements. The OSP host complex 880 and the IM host complex 890 are connected through one or more host complex gateways 885 and one or more IM host complex gateways 895. Each OSP host complex gateway 885 and IM host complex gateway 895 may perform any protocol conversions necessary to enable communication between the OSP host complex 880, the IM host complex 890, and the Internet 865.

To access the IM host complex 890 to begin an instant messaging session, the client system 805 establishes a connection to the login server 870. The login server 870 typically determines whether the particular subscriber is authorized to access the IM host complex 890 by verifying a subscriber identification and password. If the subscriber is authorized to access the IM host complex 890, the login server 870 employs a hashing technique on the subscriber's screen name to identify a particular IM server 8902 for use during the subscriber's session. The login server 870 provides the client system 805 with the IP address of the particular IM server 8902, gives the client system 805 an encrypted key (that is, a cookie), and breaks the connection. The client system 805 then uses the IP address to establish a connection to the particular IM server 8902 through the communications link 815, and obtains access to that IM server 8902 using the encrypted key. Typically, the client system 805 will be equipped with a Winsock Application Programming Interface (API) that enables the client system 805 to establish an open TCP connection to the IM server 8902.

Once a connection to the IM server 8902 has been established, the client system 805 may directly or indirectly transmit data to and access content from the IM server 8902 and one or more associated domain servers 8904. The IM server 8902 supports the fundamental instant messaging services and the domain servers 8904 may support associated services, such as, e.g., administrative matters, directory services, chat and interest groups. The domain servers 8904 can be used to lighten the load placed on the IM server 8902 by assuming responsibility for some of the services within the IM host complex 890. By accessing the IM server 8902 and/or the domain server 8904, a subscriber can use the IM client application to view whether particular subscribers (or buddies) are online, exchange instant messages with particular subscribers, participate in group chat rooms, trade files such as pictures, invitations or documents, find other subscribers with similar interests, get customized news and stock quotes, and search the Web.

In the implementation of FIG. 9, IM server 8902 is directly or indirectly connected to a routing gateway 8906. The routing gateway 8906 facilitates the connection between the IM server 8902 and one or more alert multiplexors 8908. For example, routing gateway 8906 may serve as a link minimization tool or hub to connect several IM servers 8902 to several alert multiplexors 8908. In general, an alert multiplexor 8908 maintains a record of alerts and subscribers registered to receive the alerts.

Once the client system 805 is connected to the alert multiplexor 8908, a subscriber can register for and/or receive one or more types of alerts. The connection pathway between the client system 805 and the alert multiplexor 8908 is determined by employing a hashing technique at the IM server 8902 to identify the particular alert multiplexor 8908 to be used for the subscriber's session. Once the particular multiplexor 8908 has been identified, the IM server 8902 provides the client system 805 with the IP address of the particular alert multiplexor 8908 and gives the client system 805 an encrypted key (that is, a cookie) used to gain access to the identified multiplexor 8908. The client system 805 then uses the IP address to connect to the particular alert multiplexor 8908 through the communication link 815 and obtains access to the alert multiplexor 8908 using the encrypted key.

The alert multiplexor 8908 is connected to an alert gate 8910 that, like the IM host complex gateway 895, is capable of performing the necessary protocol conversions to enable communication with the OSP host complex 880. The alert gate 8910 is the interface between the IM host complex 890 and the physical servers, such as servers in the OSP host complex 880, where state changes are occurring. In general, the information regarding state changes will be gathered and used by the IM host complex 890. However, the alert multiplexor 8908 also may communicate with the OSP host complex 880 through the IM gateway 895, e.g., to provide the servers and subscribers of the OSP host complex 880 with certain information gathered from the alert gate 8910.

The alert gate 8910 can detect an alert feed corresponding to a particular type of alert. The alert gate 8910 may include a piece of code (alert receive code) capable of interacting with another piece of code (alert broadcast code) on the physical server where a state change occurs. In general, the alert receive code installed on the alert gate 8910 instructs the alert broadcast code installed on the physical server to send an alert feed to the alert gate 8910 upon the occurrence of a particular state change. Thereafter, upon detecting an alert feed, the alert gate 8910 contacts the alert multiplexor 8908, which in turn, informs the appropriate client system 805 of the detected alert feed.

In the implementation of FIG. 9, the IM host complex 890 also includes a subscriber profile server 8912 connected to a database 8914 for storing large amounts of subscriber profile data. The subscriber profile server 8912 may be used to enter, retrieve, edit, manipulate, or otherwise process subscriber profile data. In one implementation, a subscriber's profile data includes, e.g., the subscriber's buddy list, alert preferences, designated stocks, identified interests, geographic location and other demographic data. The subscriber may enter, edit and/or delete profile data using an installed IM client application on the client system 805 to interact with the subscriber profile server 8912.

Because the subscriber's data is stored in the IM host complex 890, the subscriber does not have to reenter or update such information in the event that the subscriber accesses the IM host complex 890 using a new or different client system 805. Accordingly, when a subscriber accesses the IM host complex 890, the IM server 8902 can instruct the subscriber profile server 8912 to retrieve the subscriber's profile data from the database 8914 and to provide, e.g., the subscriber's buddy list to the IM server 8902 and the subscriber's alert preferences to the alert multiplexor 8908. The subscriber profile server 8912 also may communicate with other servers in the OSP host complex 890 to share subscriber profile data with other services. Alternatively, user profile data may be saved locally on the client device 805.

Figure 10:
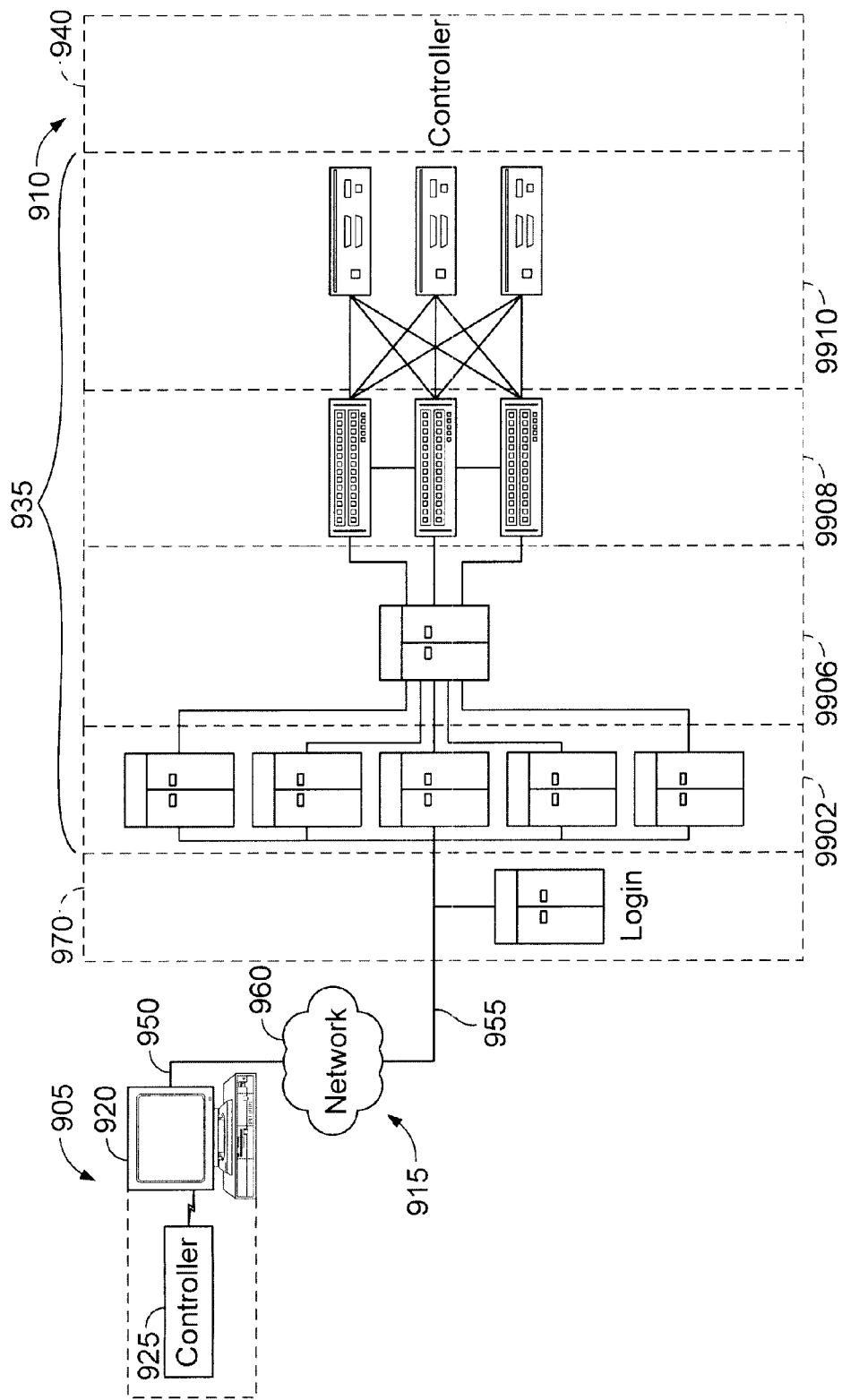

Referring to FIG. 10, a communications system 900 is capable of delivering and exchanging information between a client system 905 and a host system 910 through a communication link 915. Client system 905 typically includes one or more client devices 920 and one or more client controllers 925 for controlling the client devices 920. Host system 910 typically includes one or more host devices 935 and one or more host controllers 940 for controlling the host devices 935. The communications link 915 may include communication pathways 950, 955 enabling communications through the one or more delivery networks 960.

Examples of each element within the communication system of FIG. 10 are broadly described above with respect to FIGS. 5-9. In particular, the client system 905 and the communications link 915 typically have attributes comparable to those described with respect to client systems 405, 505, 605, 705 and 805 and communications links 415, 515, 615, 715 and 815 of FIGS. 5-9, respectively. Likewise, the host system 910 of FIG. 10 may have attributes comparable to and may illustrate one possible implementation of the host systems 410, 510, 610, 710 and 810 shown in FIGS. 5-9, respectively. However, FIG. 10 describes several aspects of one implementation of the host system 910 in greater detail, focusing primarily on one particular implementation of the login server 970 and IM host complex 990.

The client system 905 includes a client device 920 and a client controller 925. The client controller 925 is generally capable of establishing a connection to the host system 910, including the IM host complex 990. In one implementation, the client controller 925 includes an IM application for communicating with servers in the IM host complex 990 utilizing exclusive IM protocols.

The host system 910 includes a host device 935 and a host controller 940. The host controller 940 is generally capable of transmitting instructions to any or all of the elements of the host device 935. For example, in one implementation, the host controller 940 includes one or more software applications loaded on one or more elements of the host device 935. However, in other implementations, as described above, the host controller 940 may include any of several other programs, machines, and devices operating independently or collectively to control the host device 935.

The host system 910 includes a login server 970 capable of enabling communications between client systems 905 and various elements of the host system 910, including elements such as the IM host complex 990 and the OSP host complex 980; login server 970 is also capable of authorizing access by the client system 905 and those elements. The IM host complex 990 includes an IM server network 9902, a routing gateway 9906, an alert multiplexor network 9908, and one or more alert gates 9910. The IM server network 9902 may include an interconnected network of IM servers and the alert multiplexor network 9908 may include an interconnected network of alert multiplexors. In the implementation of FIG. 10, the IM server network 9902 and the alert multiplexor network 9908 are interconnected by a routing gateway 9906 that serves as a common hub to reduce the number of connections. Each IM server within IM server network 9902 can directly or indirectly communicate and exchange information with one or more of the alert multiplexors in the alert multiplexor network 9908. Each of the alert multiplexors in the alert multiplexor network 9908 may be connected to several alert gates 9910 that receive different types of alerts.

During a session, a subscriber typically will be assigned to one IM server in the IM server network 9902 and to one alert multiplexor in the alert multiplexor network 9908 based on one or more hashing techniques. In one implementation, e.g., each IM server in the IM server network 9902 may be dedicated to serving a particular set of registered subscribers. Because all of the IM servers can communicate with each other, all subscribers can communicate with each other through instant messaging. However, the IM servers and the alert multiplexors are capable of storing subscriber information and other electronic content that may be accessed by the other IM servers and alert multiplexors. Thus, in another implementation, each alert multiplexor in the alert multiplexor network 9908 may be dedicated to storing information about a particular set or subset of alerts. Because all of the alert multiplexors can communicate with each other, all registered subscribers can receive all types of alerts. This networking arrangement enables the load to be distributed among the various servers in the IM host complex 990 while still enabling a subscriber to communicate, share information, or otherwise interact with other subscribers and servers in the IM host complex 990.

A number of implementations have been described. Nevertheless, it will be understood that various modifications may be made without departing from the spirit and scope of the invention. For example, advantageous results still could be achieved if steps of the disclosed techniques were performed in a different order and/or if components in the disclosed systems were combined in a different manner and/or replaced or supplemented by other components.

In addition, the systems, methods, and techniques described here may be implemented in digital electronic circuitry, or in computer hardware, firmware, software, or in combinations of them. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

Accordingly, other implementations are within the scope of the following claims.

What is claimed is:

1. A computer-implemented method for making electronic information more readily available to access requesters, the method comprising:

identifying an access requester requesting access to electronic information stored at a source storage device;

determining a demographic for the identified access requester;

assigning cache values to the electronic information stored within the source storage device, based on a frequency of past requests to access the electronic information;

anticipating, by a computing device, a demand for access to the electronic information and related electronic information by the access requester based on the demographic determined for the access requester and the cache value assigned to the electronic information;

identifying at least one of the electronic information and the related electronic information stored at the source storage device for transport to a destination storage device that is more accessible to the access requester relative to the source storage device, based on the anticipated demand; and copying the identified electronic information from the source storage device to the destination storage device.

2. The method of claim 1, wherein identifying at least one of the electronic information and the related electronic information for transport is based on the anticipated demand and a current request of the access requester requesting access to at least one of the electronic information and the related electronic information.

3. The method of claim 1, wherein the demographic of the access requester is determined based on information that is common to multiple access requesters within the same demographic.

4. The method of claim 1, wherein the demographic of the access requester is determined based on information that is obtained from several access requesters within the same demographic.

5. The method of claim 1, wherein anticipating the demand for access to the electronic information and the related electronic information by the access requester comprises anticipating the demand based on a predetermined popularity of the identified portion of the electronic information for the demographic of the access requester.

6. The method of claim 1, further comprising:
determining whether the identified electronic information is accessible to the access requester from the destination storage device; and
providing the access requester with access to the identified electronic information copied to the destination storage device, based on the determination,
wherein the access requester is provided with access to the identified electronic information from the source storage device only if the identified electronic information is not accessible to the access requester from the destination storage device.

7. The method of claim 1, wherein the destination storage device is more geographically proximate to the access requester than the source storage device such that the copying step includes copying the identified electronic information on a storage device that is more geographically proximate to the access requester than the source storage device.

8. The method of claim 1, wherein the destination storage device is more electronically proximate to the access requester than the source storage device such that the copying step includes copying the identified electronic information on a storage device that is more electronically proximate to the access requester than the source storage device.

9. The method of claim 1, wherein the source storage device resides on a central server and the destination storage device resides on a distributed server such that the copying step includes duplicating the identified electronic information from the central server to the distributed server.

10. The method of claim 1, wherein the demand is anticipated based on the demographic of the access requester and at least one of a current request and past requests by the access requester.

11. The method of claim 1, wherein the demographic of the access corresponds to a class of access requestors.

12. The method of claim 1, wherein the demographic of the access requester is determined based on past requests by the access requester for access to electronic information that is not related to the identified electronic information.

13. The method of claim 1, wherein the demographic of the access requester is determined based on information including one or more of feedback by access requesters regarding topics of interest, formal or informal polling data, and survey research.

14. The method of claim 1, wherein anticipating the demand further comprises:
measuring a frequency of the past requests for access to electronic information that is not related to the identified electronic information; and
anticipating, by the computing device, the demand of the access requester for access to the electronic information based on the measured frequency of the past requests.

15. The method of claim 1, wherein anticipating the demand further comprises:
measuring a volume of the past requests for access to electronic information that is not related to the identified electronic information; and
anticipating, by the computing device, the demand of the access requester for access to the electronic information based on the measured volume of the past requests.

16. The method of claim 1, wherein anticipating the demand further comprises:
measuring a file size of electronic information of the past requests for access to electronic information; and
anticipating, by the computing device, the demand of the access requester for access to the electronic information based on the measured file size of electronic information.

17. The method of claim 1, further comprising:
sending, to the access requester, a notice that the copied electronic information is available at the destination storage device that is more accessible to the access requester than the source storage device.

18. The method of claim 1, wherein anticipating the demand further comprises anticipating the demand while an access request for the electronic information is being made.

19. A system comprising:
at least one computer; and
at least one memory device coupled to the at least one computer having instructions stored thereon which, when executed by the at least one computer, causes the at least one computer to perform operations comprising:
identifying an access requester requesting access to electronic information stored at a source storage device;
determining a demographic for the identified access requester;
assigning cache values to the electronic information stored within the source storage device, based on a frequency of past requests to access the electronic information;
anticipating, by a computing device, a demand for access to the electronic information and related electronic information by the access requester based on the demographic determined for the access requester and the cache value assigned to the electronic information;

identifying at least one of the electronic information and the related electronic information stored at the source storage device for transport to a destination storage device that is more accessible to the access requester relative to the source storage device, based on the anticipated demand; and copying the identified electronic information from the source storage device to the destination storage device.

20. A machine-readable storage device tangibly embodying at least one computer program, the at least one program comprising instructions that when executed by at least one processor cause the at least one processor to perform operations comprising:

identifying an access requester requesting access to electronic information stored at a source storage device;

determining a demographic for the identified access requester;

assigning cache values to the electronic information stored within the source storage device, based on a frequency of past requests to access the electronic information;

anticipating, by a computing device, a demand for access to the electronic information and related electronic information by the access requester based on the demographic determined for the access requester and the cache value assigned to the electronic information;

identifying at least one of the electronic information and the related electronic information stored at the source storage device for transport to a destination storage device that is more accessible to the access requester relative to the source storage device, based on the anticipated demand; and copying the identified electronic information from the source storage device to the destination storage device.

* * * * *